(12) United States Patent
Beard

(10) Patent No.: US 11,185,724 B1
(45) Date of Patent: Nov. 30, 2021

(54) FIREFIGHTING GAS RELEASING APPARATUSES AND METHODS

(71) Applicant: Philip Beard, Alexandria, LA (US)

(72) Inventor: Philip Beard, Alexandria, LA (US)

(*) Notice: Subject to any disclaimer, the term of this patent is extended or adjusted under 35 U.S.C. 154(b) by 0 days.

(21) Appl. No.: 17/179,671

(22) Filed: Feb. 19, 2021

Related U.S. Application Data

(60) Provisional application No. 62/978,892, filed on Feb. 20, 2020.

(51) Int. Cl.
*A62C 3/02* (2006.01)
*B64D 1/16* (2006.01)
*A62C 99/00* (2010.01)

(52) U.S. Cl.
CPC ............ *A62C 3/0278* (2013.01); *A62C 3/025* (2013.01); *A62C 3/0228* (2013.01); *B64D 1/16* (2013.01); *A62C 99/0018* (2013.01)

(58) Field of Classification Search
CPC ..... A62C 3/0278; A62C 3/025; A62C 3/0228; A62C 99/0018; B64D 1/16
USPC .... 169/53, 35, 36, 46, 47, 26, 28, 29, 70, 9, 169/11, 12; 102/382, 383, 334, 364
See application file for complete search history.

(56) References Cited

U.S. PATENT DOCUMENTS

| | | | |
|---|---|---|---|
| 1,317,551 A * | 9/1919 | Chambers | F42B 12/44 169/28 |
| 2,174,606 A | 10/1936 | Tansill | |
| 2,450,537 A | 10/1948 | Williamson | |
| 2,665,768 A | 1/1954 | Talbot | |
| 3,070,172 A | 12/1962 | Carter, Jr. | |
| 4,344,489 A | 8/1982 | Bonaparte | |
| 6,470,805 B1 * | 10/2002 | Woodall | A62C 3/025 169/47 |
| 6,513,602 B1 | 2/2003 | Lewis et al. | |
| 7,121,353 B2 * | 10/2006 | Setzer | A62C 3/025 169/28 |
| 7,478,680 B2 * | 1/2009 | Sridharan | A62C 3/025 169/36 |
| 7,484,567 B2 | 2/2009 | Demange et al. | |
| 9,149,672 B2 | 10/2015 | Al-Anzi | |
| 9,808,660 B2 * | 11/2017 | Kilburn | A62C 3/025 |
| 2003/0006047 A1 | 1/2003 | Silverstein et al. | |
| 2010/0126740 A1 * | 5/2010 | Hartmann | A62C 3/025 169/70 |
| 2013/0048317 A1 * | 2/2013 | Charlton | F42B 12/50 169/53 |

(Continued)

*Primary Examiner* — Steven J Ganey
(74) *Attorney, Agent, or Firm* — R. Keith Harrison

(57) ABSTRACT

Firefighting gas releasing apparatuses may include a trigger housing. A containment shell may have a plurality of shell sections pivotally carried by the trigger housing. The plurality of shell sections may be positional in a closed shell configuration and an open shell configuration. A shell interior may be formed by the containment shell in the closed shell configuration. The shell interior may be configured to contain a supply of at least one fire-suppressing gas. A selectively-actuatable shell releasing assembly may be carried by the trigger housing. The shell releasing assembly may be configured to engage the plurality of shell sections and maintain the containment shell in the closed shell configuration and disengage the plurality of shell sections for deployment of the containment shell to the open shell configuration. Firefighting gas releasing methods are also disclosed.

20 Claims, 16 Drawing Sheets

(56) References Cited

U.S. PATENT DOCUMENTS

2016/0216091 A1\* 7/2016 Erickson ................ A62C 3/025

\* cited by examiner

FIREFIGHTING GAS RELEASING APPARATUSES AND METHODS

CROSS-REFERENCE TO RELATED APPLICATIONS

This application claims the benefit of U.S. provisional application No. 62/978,892, filed Feb. 20, 2020 and entitled FIREFIGHTING GAS RELEASING APPARATUSES AND METHODS, which provisional application is hereby incorporated by reference herein in its entirety.

FIELD

Illustrative embodiments of the disclosure are generally directed to apparatuses and methods for fighting fires. More particularly, illustrative embodiments of the disclosure are directed to firefighting gas releasing apparatuses and methods in which a fire-suppressing gas such as carbon dioxide is released above at least a portion of at least one fire to form a dome-shaped gaseous fog or cloud enclosure which encloses, suppresses and extinguishes the fire.

BACKGROUND

The background description provided herein is solely for the purpose of generally presenting the context of the illustrative embodiments of the disclosure. Aspects of the background description are neither expressly nor impliedly admitted as prior art against the claimed subject matter.

Every year, incalculable billions of dollars in property damage and thousands of lives lost are attributable to the ravages of forest fires and similar fire tragedies. Homes, businesses and families are destroyed by the widespread destruction created by massive wildfires. While it is a useful protection tool, insurance cannot adequately replace the losses of property, possessions, life and health. The loss of forest vegetation, such as that caused by wildfires in the rainforests, does irreparable damage to the world environmental system. Rampant erosion resulting from loss of surface vegetation creates mudslides in hilly and mountainous terrain, causing severe damage to roads, residences and undamaged timber. Mudslides can also block rivers and streams with disastrous flood damage.

Wildlife may be the biggest loser of all in massive forest fires. Aside from the obvious loss of habitat, wildlife survivors may be forced into heavily populated areas to compete for space and food. Oftentimes, wildlife is simply eliminated or trapped and moves to less-adaptable regions.

As of Jan. 10, 2020, massive wildfires which began in Australia in October 2019 have resulted in over 30 facilities and the loss of over 2,200 homes. News reports estimate that a half-billion animals have been killed by the wildfires. An area roughly the size of Massachusetts has been reduced to scorched earth and ash. Initial efforts to curtail the spread of wildfire have proven to be ineffective with respect to timely and specific efforts, thus resulting in the current devastating destruction.

A condition which is created by some wildfires is gaining notoriety and was first verified in the Canberra bush fires of 2003. The phenomenon is known as "fire whirl" or "fire devil" and develops from rising heat and turbulent winds in a wildfire. Variously referred to as a "fire tornado" or "firenado", these phenomena only resemble tornadoes and are not classified as such. Fire whirls are very dangerous because they can appear suddenly and reach a height of 160 feet to ½ mile for very large fire whirls. Destruction caused by fire whirls can be similar to that caused by tornadoes and may include uprooted trees and scattered, burning debris. The occurrence of fire whirls presents a very hazardous condition to firefighters, aircraft and other ground personnel.

Firefighting gas releasing apparatuses and methods in which a fire-suppressing gas such as carbon dioxide is released above at least a portion of at least one fire to form a dome-shaped gaseous fog or cloud enclosure which encloses, suppresses and extinguishes the fire may be desirable for some applications.

SUMMARY

Illustrative embodiments of the disclosure are generally directed to firefighting gas releasing apparatuses in which a fire-suppressing gas such as carbon dioxide is released above at least a portion of at least one fire to form a dome-shaped gaseous fog or cloud enclosure which encloses, suppresses and extinguishes the fire. An illustrative embodiment of the firefighting gas releasing apparatuses may include a trigger housing. A containment shell may have a plurality of shell sections pivotally carried by the trigger housing. The plurality of shell sections may be positional in a closed shell configuration and an open shell configuration. A shell interior may be formed by the containment shell in the closed shell configuration. The shell interior may be configured to contain a supply of at least one fire-suppressing gas. A selectively-actuatable shell releasing assembly may be carried by the trigger housing. The shell releasing assembly may be configured to engage the plurality of shell sections and maintain the containment shell in the closed shell configuration and disengage the plurality of shell sections for deployment of the containment shell to the open shell configuration. Accordingly, the firefighting gas releasing apparatus may be deployed over at least a portion of at least one tire and the shell releasing assembly selectively actuated to open the shell sections of the containment shell and release the fire-suppressing gas, which forms the fog or cloud enclosure that encloses, suppresses and extinguishes the fire.

Illustrative embodiments of the disclosure are further generally directed to firefighting gas releasing methods. An illustrative embodiment of the firefighting gas releasing methods may include obtaining at least one firefighting gas releasing apparatus having a trigger housing and an openable containment shell with a plurality of shell sections pivotally attached to the trigger housing; placing at least one fire-suppressing gas in the containment shell; deploying the firefighting gas releasing apparatus over at least a portion of at least one fire; and forming at least one dome-shaped gaseous fog enclosure over the at least a portion of the at least one fire by opening the containment shell and releasing the at least one fire-suppressing gas from the containment shell over the at least a portion of the at least one fire.

BRIEF DESCRIPTION OF THE DRAWINGS

Illustrative embodiments of the disclosure will now be described, by way of example, with reference to the accompanying drawings, in which.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 6:
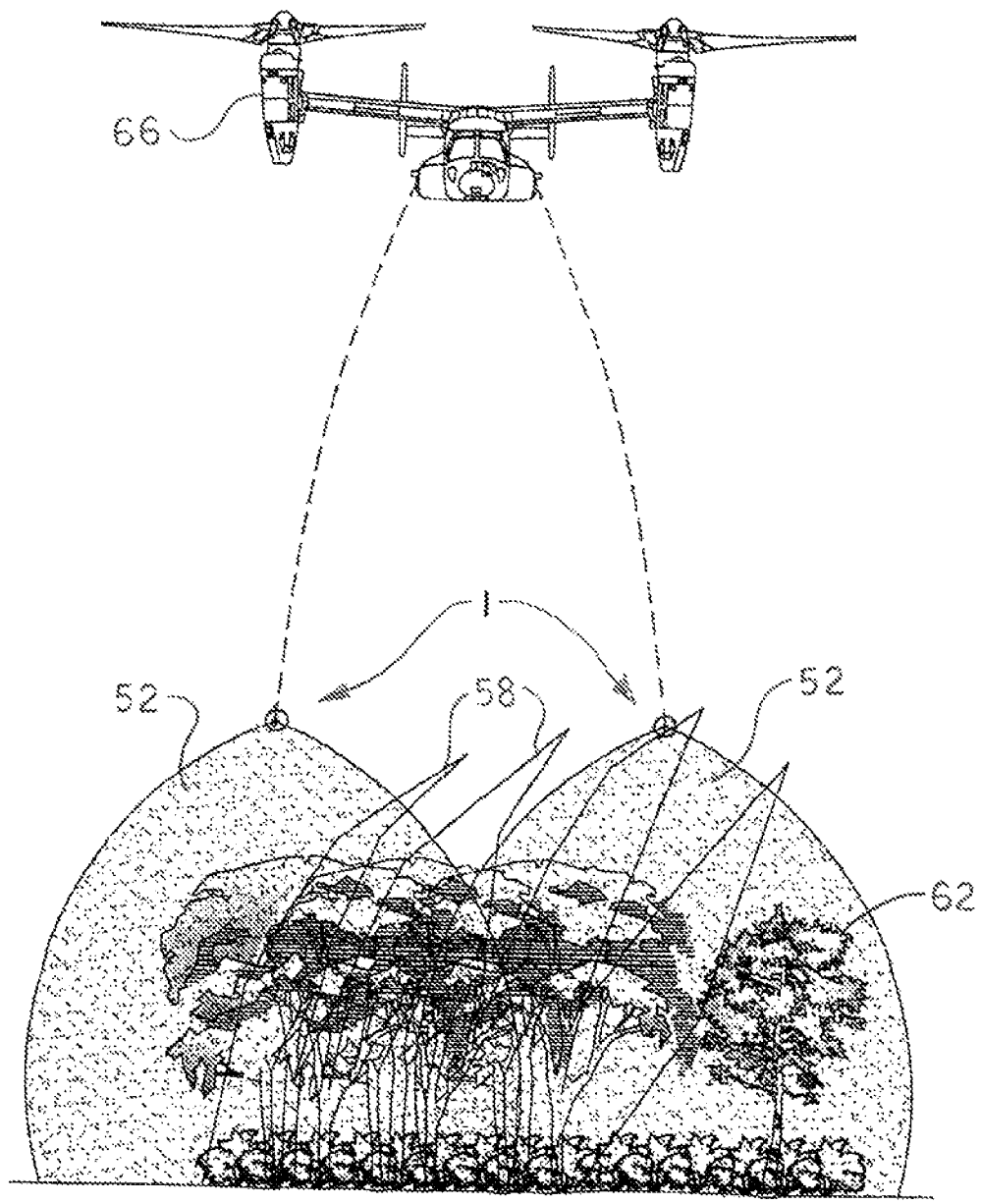
FIG. 6 is a front view of a fire with a deployment aircraft delivering a pair of the firefighting gas releasing apparatuses over the fire as the apparatuses deploy from the closed shell to the open shell configuration and release a fire-suppressing gas which forms a dome-shaped gaseous fog or cloud enclosure over the fire to suppress and extinguish the fire in typical application of the apparatus.

Referring initially to FIG. 6 of the drawings, an illustrative embodiment of the firefighting gas releasing apparatus, hereinafter apparatus, of the disclosure is generally indicated by reference numeral 1. As will be hereinafter described, the apparatus 1 may be configured to releasably contain at least one fire-suppressing gas 50 (FIG. 2) such as carbon dioxide, for example and without limitation. At least one apparatus 1 (a pair of which is illustrated in FIG. 6) may be deployed from at least one deployment aircraft 66 over at least a portion of at least one fire 58 to release the fire-suppressing gas 50 over and around the fire 58. The fire-suppressing gas 50 may fall over the fire 58 in a dome-shaped gaseous fog or cloud enclosure 52 which cools and blocks flow of oxygen to the fire 58. Accordingly, the fire 58 may consume the oxygen within the dome-shaped pattern of the gaseous fog or cloud enclosure 52 such that the fire 58 is suppressed and extinguished. In some applications, the deployed apparatus 1 may be retrieved and reused.

Figure 1:
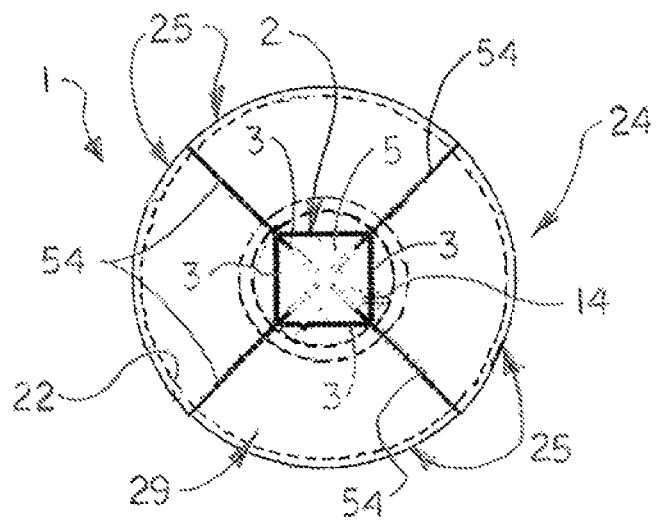
FIG. 1 is a top view of an illustrative embodiment of the firefighting gas releasing apparatuses.

Referring next to FIGS. 1-5 of the drawings, the apparatus 1 may include a trigger housing 2 having a trigger housing interior 8. The trigger housing 2 may have any design or shape which is consistent with the functional requirements of the trigger housing 2 in the apparatus 1. Accordingly, the trigger housing 2 may have at least one trigger housing sidewall 3. As illustrated in FIG. 1, in some embodiments, the trigger housing 2 may be square or rectangular in top view or cross-section with four trigger housing sidewalls 3. In other embodiments, the trigger housing sidewall 3 may be continuous and have a cylindrical shape or may have a non-rectangular polygonal shape. As particularly illustrated in FIGS. 4 and 5, a trigger housing bottom wall 4 and a trigger housing top wall 5 may be provided on the trigger housing sidewalls 3 to close the trigger housing interior 8.

Figure 4:
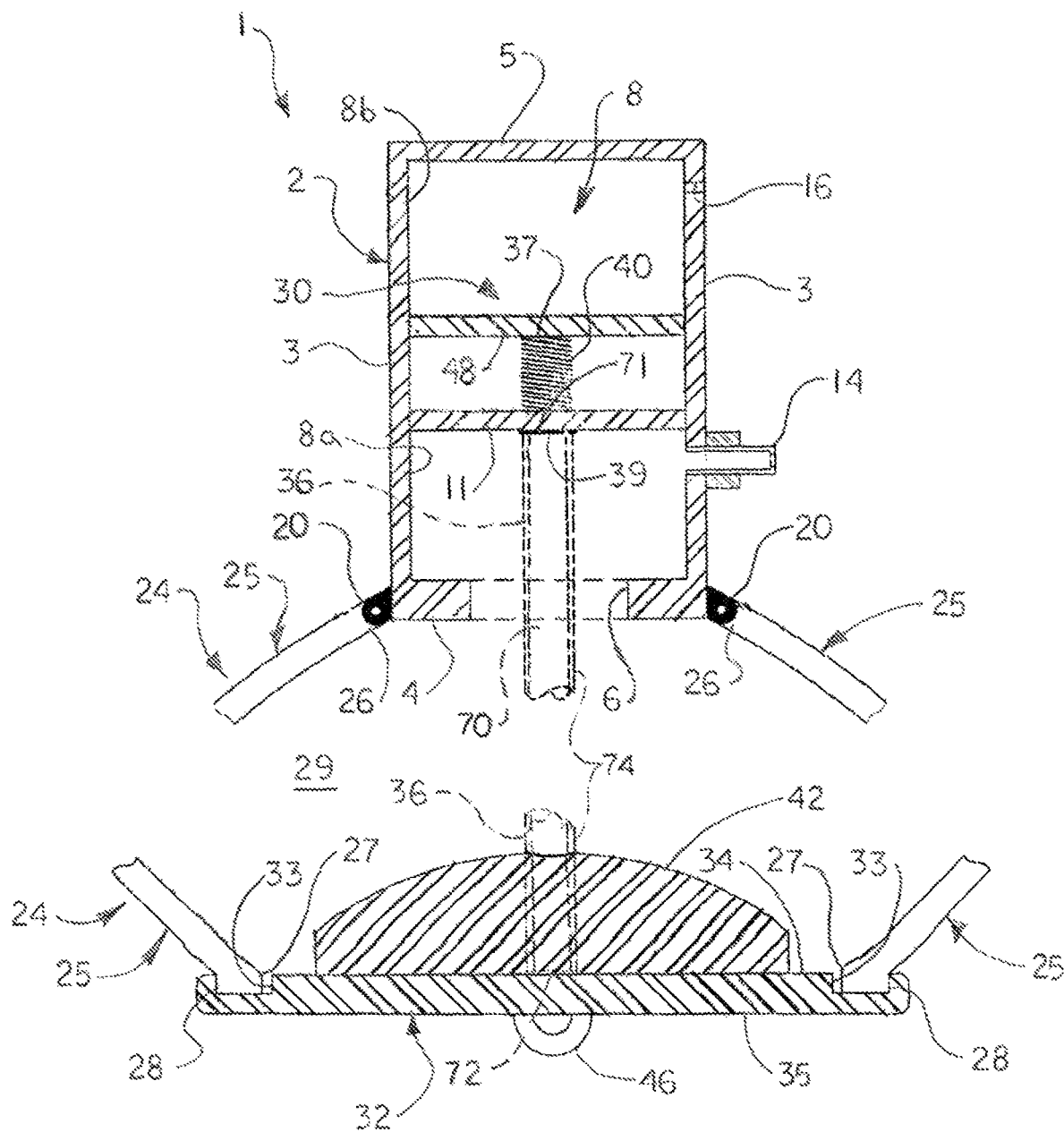
FIG. 4 is an exploded sectional view of a typical trigger housing, containment shell and shell releasing assembly of the illustrative firefighting gas releasing apparatus with the containment shell deployed in the closed shell configuration.
Figure 5:
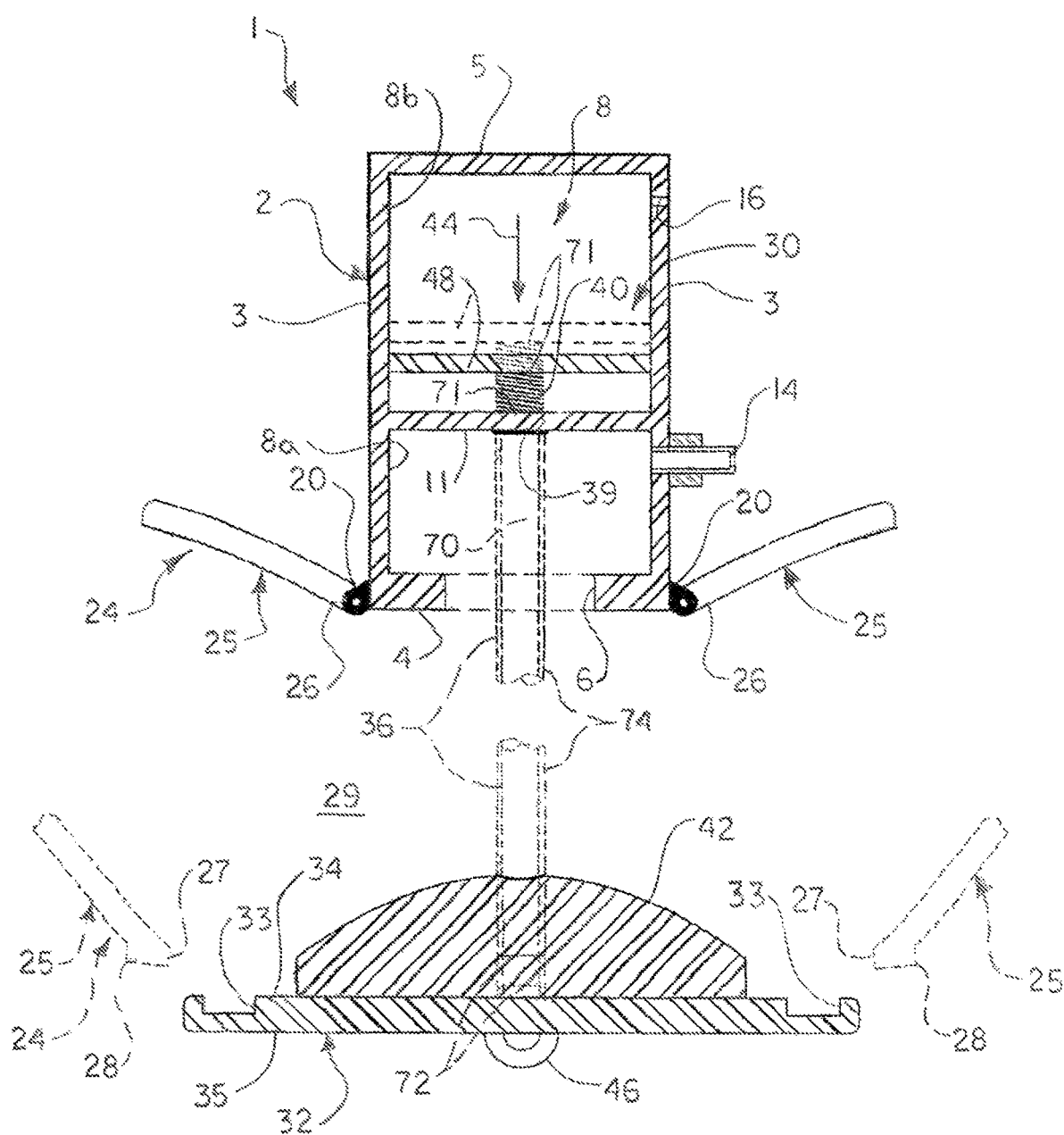
FIG. 5 is an exploded sectional view of the trigger housing, containment shell and shell releasing assembly of the illustrative firefighting gas releasing apparatus with the containment shell deployed in the open shell configuration.

A spring plate 11 may extend between the trigger housing sidewalls 3. As illustrated in FIGS. 4 and 5, the spring plate 11 may divide the trigger housing interior 8 into a lower filling chamber 8a and an upper combustion chamber 8b. As illustrated in FIG. 5, the combustion chamber 8b may be configured to contain an explosive charge 44 for purposes which will be hereinafter described. A sleeve shield opening 6 may extend through the trigger housing bottom wall 4 in communication with the filling chamber 8a. At least one filling port 14 may be disposed in fluid communication with the filling chamber 8a through the trigger housing sidewall 3. At least one exhaust port 16 may be disposed in fluid communication with the combustion chamber 8b typically through the trigger housing sidewall 3. The purposes of the sleeve shield opening 6, filling port 14 and exhaust port 16 will be hereinafter described. The filling port 14 and the exhaust port 16 may include one-way valves (not illustrated) to facilitate unidirectional flow of the fire-suppressing gas 50 into the filling chamber 8a and of exhaust gas (not illustrated) from the combustion chamber 8b, respectively.

Figure 2:
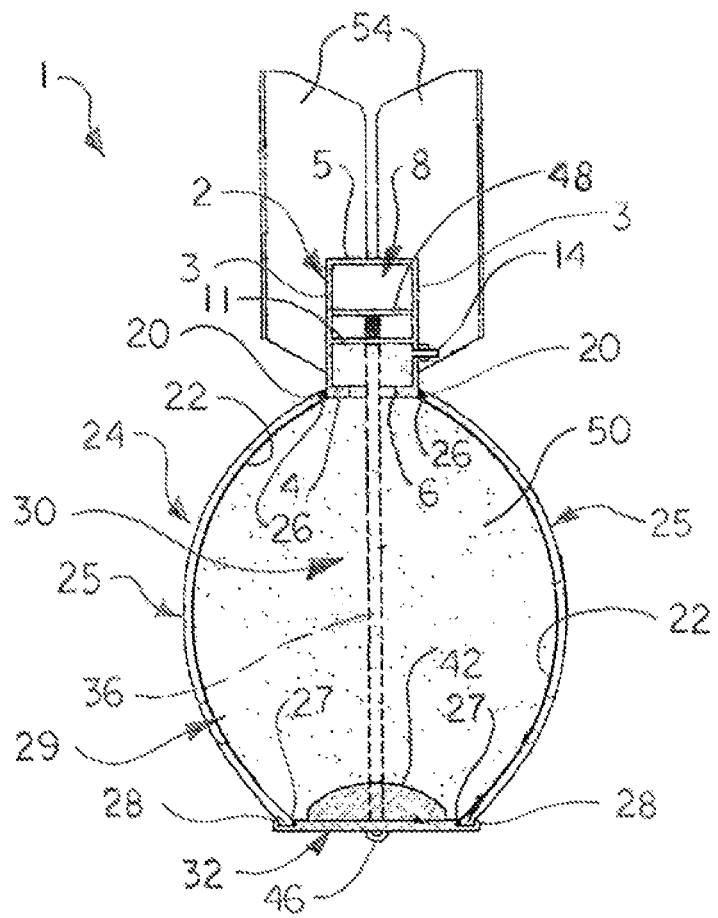
FIG. 2 is a longitudinal sectional view of the illustrative firefighting gas releasing apparatus with the containment shell of the apparatus deployed in a pre-released, closed shell configuration.
Figure 3:
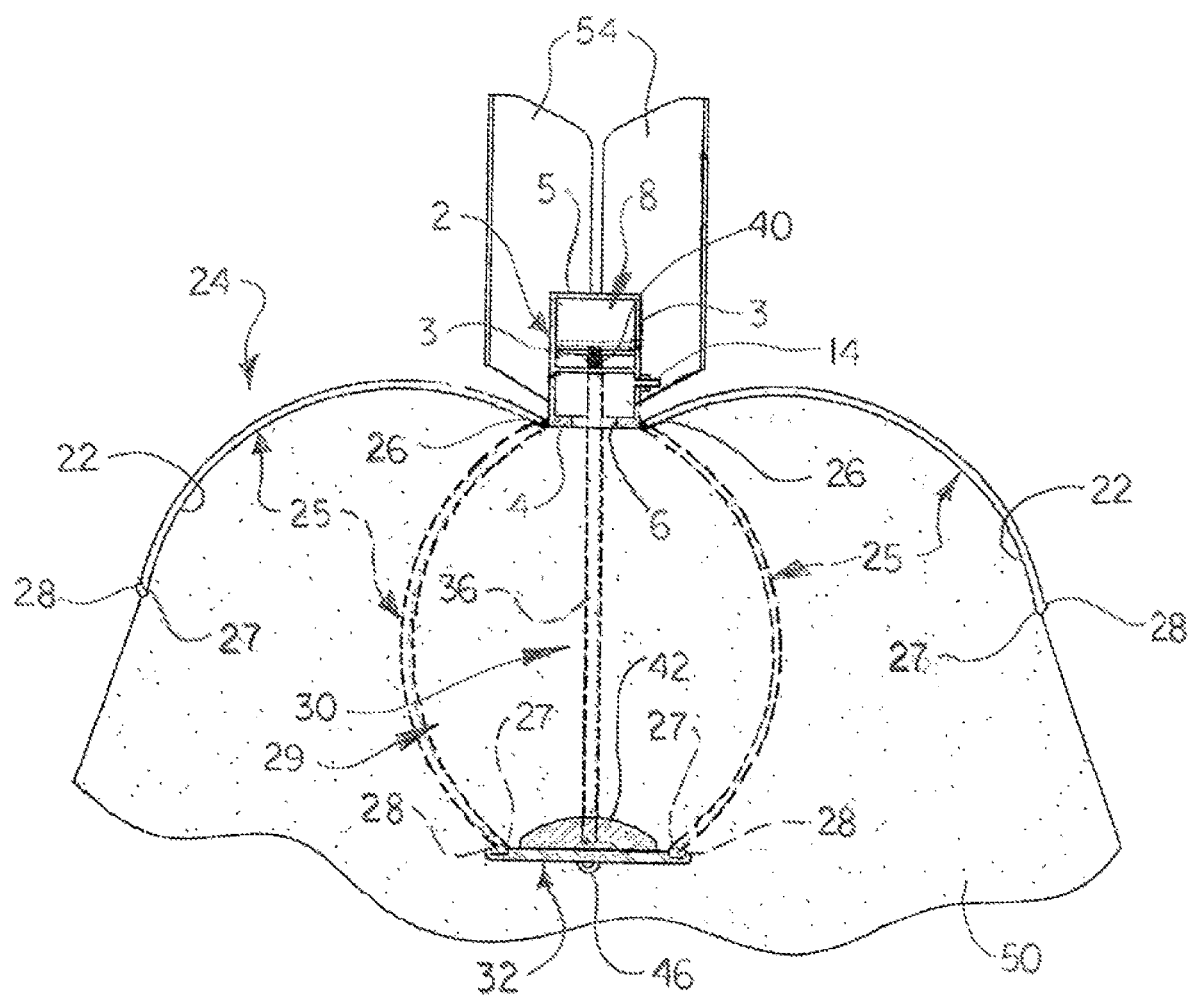
FIG. 3 is a longitudinal sectional view of the illustrative firefighting gas releasing apparatus with the containment shell deployed in a released, open shell configuration.

An openable containment shell 24, having a shell interior 29, may extend from the trigger housing 2. The containment shell 24 may include multiple shell sections 25 pivotally attached to the trigger housing 2. In some embodiments, the trigger housing 2 may have four trigger housing side walls 3. Four shell sections 25 may be pivotally attached to the respective housing side walls 3. The shell sections 25 may be deployable from the closed shell configuration illustrated in FIGS. 2 and 4 to the open shell configuration illustrated in FIGS. 3 and 5 typically as will be hereinafter described. In the closed shell configuration, the shell interior 29 of the containment shell 24 is configured to contain a supply of the fire-suppressing gas 50, as illustrated in FIG. 2. In the open shell configuration, the shell interior 29 is configured to release the fire-suppressing gas 50, as illustrated in FIG. 3.

The shell sections 25 of the containment shell 24 may be pivotally attached to the trigger housing sidewall 3 of the trigger housing 2 via respective shell hinges 20. As illustrated in FIGS. 1-3, each shell section 25 may be outwardly-curved to impart a bulb-shaped, spherical, truncated spherical, conical or otherwise-shaped enclosure to the containment shell 24 for containment of the fire-suppressing gas 50 in the closed shell configuration of the containment shell 24.

Each shell section 25 of the containment shell 24 may have a proximal shell edge 26 which is pivotally attached to the trigger housing 2 typically via the corresponding shell hinge 20 and a distal shell edge 27 which is opposite the proximal shell edge 26. A pair of side shell edges (not illustrated) may extend from the proximal shell edge 26 to the distal shell edge 27. Shell sealing gaskets 22 (FIGS. 1-3) may extend along the side shell edges of each shell section 25 to form a fluid-tight seal with the adjacent shell section 25 in the closed shell configuration of the containment shell 24. A shell retention flange 28 may extend along the distal shell edge 27 for purposes which will be hereinafter described.

A selectively-actuatable shell releasing assembly 30 may facilitate deployment of the containment shell 24 from the closed shell configuration to the open shell configuration. The shell releasing assembly 30 may have any design which is suitable for the purpose. As particularly illustrated in FIGS. 4 and 5, in some embodiments, the shell releasing assembly 30 may include a piston 48 which is slidably disposed in the combustion chamber 8b of the trigger housing interior 8. An elongated shell release member 36 may include a release rod 70. A rod sheath 74 may extend over the release rod 70. The release rod 70 may have a proximal rod end 71 to which the piston 48 is attached and a distal rod end 72 opposite the proximal rod end 71. The shell release member 36 may extend through a plate opening (not illustrated), typically sealed via a sealing gasket 39, in the spring plate 11 and through the sleeve shield opening 6 in the trigger housing bottom wall 4 and the shell interior 29 of the closed containment shell 24.

A shell base plate 32 may terminate the distal rod end 72 of the release rod 70. In some embodiments, the shell base plate 32 may include a ¼" thick, circular stainless-steel plate. The shell base plate 32 may have an interior plate surface 34 which faces the shell interior 29 and an exterior plate surface 35 which faces the outside of the shell interior 29 of the containment shell 24. As illustrated in FIGS. 4 and 5, a circular shell groove 33 may be provided in the interior plate surface 34 of the shell base plate 32. A base plate gasket 42 may be provided on the interior plate surface 34 inside the shell groove 33. The shell release member 36 may extend through or into a gasket opening (not illustrated) in the base plate gasket 42. Accordingly, the base plate gasket 42 may impart a fluid-tight seal with the shell release member 36. A shell deployment hook 46 may extend from the exterior plate surface 35 of the shell base plate 32 for purposes which will be hereinafter described.

As illustrated in FIGS. 4 and 5, a compression spring 40 may be interposed between the spring plate 11 and the piston 48 at the proximal rod end 71 of the release rod 70. In a shell retaining configuration of the shell releasing assembly 30, the compression spring 40 may bias the piston 48 away from the spring plate 11 into the combustion chamber 8b, as indicated by the phantom lines in FIG. 5. Accordingly, when the shell releasing assembly 30 retains the containment shell 24 in the closed shell configuration, the piston 48 may bias the attached release rod 70 of the shell release member 36 and the shell base plate 32 toward the shell interior 29 of the containment shell 24. The shell groove 33 in the shell base plate 32 may receive the shell retention flanges 28 on the respective shell sections 25 to constrain or maintain the shell sections 25 in the closed shell configuration illustrated in FIGS. 2 and 4. As illustrated in FIG. 5, selective discharge of the explosive charge 44 in the combustion chamber 8b of the trigger housing 2 may actuate the shell releasing assembly 30 from the shell retaining configuration to a shell releasing configuration in which the piston 48 is driven toward the spring plate 11 against the bias imparted by the compression spring 40, as indicated by the solid lines of the piston 48 in FIG. 5. This action may cause the release rod 70 of the shell release member 36 to push the shell base plate 32 away from the shell interior 29 such that the shell retention flanges 28 on the respective shell sections 25 disengage the shell groove 33 and pivot outwardly at the respective shell hinges 20 to the open shell configuration illustrated in FIGS. 3 and 5, typically responsive to the outward pressure of the fire-suppressing gas 50 contained in the shell interior 29. As the shell releasing assembly 30 deploys between the shell retaining configuration and the shell releasing configuration, the rod sheath 74 of the shell release member 36 may prevent the release rod 70 from seizing up.

In some embodiments, multiple tail fins 54 may extend from the trigger housing 2 opposite the containment shell 24. The tail fins 54 may be configured to guide the falling apparatus 1 to the desired area above the fire 58 (FIG. 1) and facilitate vertical alignment as the apparatus 1 is deployed from the deployment aircraft 66, as illustrated in FIG. 1 and will be hereinafter described.

The trigger housing 2, the shell sections 25 of the containment shell 24, the components of the shell releasing assembly 30 and the tail fins 54 may be fabricated of a metal such as stainless steel, for example and without limitation, and/or other suitable materials such as high-density plastics and composite materials. The trigger housing 2 may include provisions or features for placing the explosive charge 44 (FIG. 5) in the combustion chamber 8b of the trigger housing interior 8. For example and without limitation, in some embodiments, the trigger housing top wall 5 may form a lid which may threadably and/or otherwise detachably engage the trigger housing sidewalls 3 for selective removal and opening of the combustion chamber 8b and placement of the explosive charge 44 therein. The trigger housing 2 may also include the required components necessary for selective detonation of the explosive charge 44, such as proximity fuses and/or triggering devices, for example and without limitation, according to the knowledge of those skilled in the art. In some embodiments, the proximity fuses and/or triggering devices may be remote-controlled through transmission of RF (Radio Frequency) or other signals. In other embodiments, these components may be hardwired to a control module which may be contained in the deployment aircraft 66. The control wiring (not illustrated) may extend along a retrieval line or cable (not illustrated) which may connect the apparatus 1 to the deployment aircraft 66 for retrieval of the apparatus 1 after use, as will be hereinafter further described.

Referring next to FIGS. 1-6 of the drawings, in typical application, at least one apparatus 1 may be deployed from at least one deployment aircraft 66 over at least a portion of at least one fire 58 to suppress and extinguish the fire 58, as illustrated in FIG. 6. In some applications, the fire 58 may be a forest fire or wildfire which consumes trees, brush, grass and/or other vegetation 62, and may additionally or alternatively consume homes, offices and/or other buildings. Accordingly, the fire 58 may cover a large area in an urban and/or rural setting. In other applications, the fire 58 may be more limited in area.

The deployment aircraft 66 may include any type of aerial vehicle which is suitable for flying over the fire 58 and dropping or deploying the apparatus 1 above the fire 58. Non-limiting examples of deployment aircraft 66 which may be suitable for the purpose include both manned and unmanned helicopters, airplanes and balloons and rockets and drones. The particular size and type of deployment aircraft 66 which is used for a particular application may depend on such factors as the size or extent of the fire 58, fire intensity or accessibility and the size and weight of the apparatus 1. One type of deployment aircraft 66 which may be suitable for some applications includes the BELL™ BOEING™ V-22 Osprey aircraft. The Osprey is a type of twin-engine tilt-rotor VTOL (Vertical Takeoff and Landing) aircraft with exceptional maneuvering characteristics.

The apparatus 1 may be prepared for deployment by initially positioning the shell sections 25 in the closed shell configuration illustrated in FIGS. 1, 2 and 4. Accordingly, the shell base plate 32 of the shell releasing assembly 30 may initially be pulled away from the shell sections 25 of the containment shell 24 such that the release rod 70 of the shell release member 36 slides within the rod sheath 74 and pulls the piston 40 in the combustion chamber 8b toward the spring plate 11 against the bias imparted by the compression spring 40, as indicated by the solid lines of the piston 48 in FIG. 5. This may be accomplished by, for example, attaching pliers or other suitable pulling tool (not illustrated) to the shell deployment hook 46 on the exterior plate surface 35 of the shell base plate 32 and pulling the shell base plate 32 using the tool. This action may facilitate initial complete disengagement of the shell retention flanges 28 on the respective shell sections 25 from the shell groove 33 in the shell base plate 32, as further illustrated in FIG. 5. The shell sections 25 of the containment shell 24 may next be pivoted on the trigger housing 2 at the respective shell hinges 20 from the open shell configuration to the closed shell configuration. The shell base plate 32 may then be released such that the compression spring 40 biases the piston 48 back toward the combustion chamber 8b as the shell retention flanges 28 on the respective shell sections 25 insert into the shell groove 33 in the interior plate surface 34 of the shell base plate 32. Accordingly, the shell releasing assembly 30 is disposed in the shell retaining configuration and the release rod 70 of the shell release member 36, biased by the compression spring 40, pulls the shell base plate 32 against the shell sections 25 to ensure that the interior surface of the shell groove 33 forms and maintains a fluid-tight seal with the shell retention flanges 28 on the respective shell sections 25, as illustrated in FIG. 4.

A supply of the fire-suppressing gas 50 may be placed in the shell interior 29 of the containment shell 24. The fire-suppressing gas 50 may include at least one inert gas which can be released from the containment shell 24 to form a dome-shaped gaseous fog or cloud enclosure 52 (FIG. 6) over at least a portion of the fire 58 which cools, suppresses and extinguishes the fire 58. In some embodiments, the fire-suppressing gas 50 may include a combination of inert gases. For example and without limitation, the fire-suppressing gas 50 may include gaseous or supercritical carbon dioxide alone or in combination with one or more other inert gases such as nitrogen and/or argon. A gas supply (not illustrated) which contains the fire-suppressing gas 50 in a compressed or supercritical form may be coupled to the filling port 14 on the trigger housing 2. The fire-suppressing gas 50 may be introduced through the filling port 14 through the filling chamber 8a and the sleeve shield opening 6 in the trigger housing bottom wall 4 of the trigger housing 2, respectively, and into the shell interior 29 of the closed containment shell 24. When the shell interior 29 contains the desired quantity or volume of the fire-suppressing gas 50, the gas supply may be uncoupled from the filling port 14. In some embodiments, the unidirectional valve (not illustrated) in the filling port 14 may prevent escape of the fire-suppressing gas 50 from the shell interior 29. The explosive charge 44 (FIG. 5) may be placed in the combustion chamber 8b of the trigger housing interior 8.

The apparatus 1 may be placed in the deployment aircraft 66 (FIG. 6) preparatory to deployment of the apparatus 1 over the fire 58. After the deployment aircraft 66 is maneuvered in place over the fire 58, the apparatus 1 may be dropped from the aircraft over the fire 58. As the apparatus 1 falls from the deployment aircraft 66, the tail fins 54 may facilitate vertical alignment of the apparatus 1 and guide the apparatus 1 to the desired area above the fire 58 (FIG. 1). Before the apparatus 1 reaches the top of the fire 58, the explosive charge 44 may be detonated in the combustion chamber 8b of the trigger housing interior 8. Accordingly, as illustrated in FIG. 5, the detonated explosive charge 44 may drive the piston 48 toward the spring plate 11 as the compression spring 40 is compressed between the piston 48 and the spring plate 11. Simultaneously, the release rod 70 of the shell release member 36 may slide within the rod sheath 74 and push the shell base plate 32 away from the shell interior 29 of the containment shell 24. The shell retention flanges 28 on the respective shell sections 25 of the containment shell 24 may disengage from the shell groove 33 as the compressed fire-suppressing gas 50 in the shell interior 29 pushes outwardly against the shell sections 25. The shell sections 25 may then deploy outwardly from the closed shell configuration to the open shell configuration. The exhaust from the detonated explosive charge 44 may be discharged from the combustion chamber 8b through the exhaust port 16.

As illustrated in FIG. 3, the fire-suppressing gas 50 escapes the shell interior 29 of the containment shell 24 and falls over the fire 58 in the dome-shaped gaseous fog or cloud enclosure 52, as illustrated in FIG. 6. Accordingly, the gaseous fog or cloud enclosure 52 encapsulates and blocks flow of oxygen to the fire 58 as the fire 58 continues to consume the oxygen within the dome-shaped pattern of the gaseous fog or cloud enclosure 52, suppressing and extinguishing the fire 58. In some applications, particularly in the case of larger fires 58, it may be required that several apparatuses 1 be deployed over the fire 58, either in a single pass, as illustrated in FIG. 6, or multiple passes, until the fire 58 is extinguished.

In some applications, a retrieval line or cable (not illustrated) may be attached to the tail fins 54, trigger housing 2 or other component of the apparatus 1. The apparatus 1 may be dropped from the deployment aircraft 66 over the fire 50 to release the fire-suppressing gas 50, after which the retrieval line or cable may be reeled and apparatus 1 retrieved into the deployment aircraft 66 for subsequent reloading and use.

It will be appreciated by those skilled in the art that the firefighting gas releasing apparatus of the disclosure contains carbon dioxide and/or other fire-suppressing gas in a delivery system which assures safe delivery with no shrapnel effects and minimal damage to the terrain and general environment with minimal release of carbon dioxide and/or other inert gases into the atmosphere. The firefighting gas releasing apparatus and method makes use of advancements in weapons technology utilizing carbon dioxide to achieve an efficient, effective, social and environmental benefit. The outcome may save human lives, wildlife lives and injury and preserve property while minimizing and reducing the overall effect of released gases on the environment. A desirable effect of using carbon dioxide to fight wildfires is the potential elimination of chemical retardants. Use of carbon dioxide in the extinguishing of wildfires may reduce or stop the massive discharge of fire-generated carbon dioxide into the environment as well as the release of other carbon products into the soil and atmosphere.

The containment shell 24, trigger housing 2 and other components of the apparatus 1 may be fabricated in different sizes depending typically on the quantity of volume of fire-suppressing gas 50 which is to be delivered to the fire 58. While some applications of the firefighting gas releasing method contemplate the use of a deployment aircraft 66 to drop the apparatus 1 over the fire 58, the present disclosure contemplates other methods of deployment such as delivery of the apparatus 1 over the fire 58 using a rocket-propelled or hand-grenade type delivery system, for example and without limitation.

In some applications, a heavy, slow-moving deployment aircraft 66 may be used to carry a large payload in the form of one or more of the apparatuses 1. The apparatuses 1 may be deployed over the fire 58 in a "carpet bomb" strategy. This may spread the apparatuses 1 uniformly along the fire 58 to provide cooling and maximize oxygen displacement. Deployment of the apparatuses 1 may begin at the downwind end of the fire 58 and proceed successively toward those areas which have already been consumed.

Figure 7:
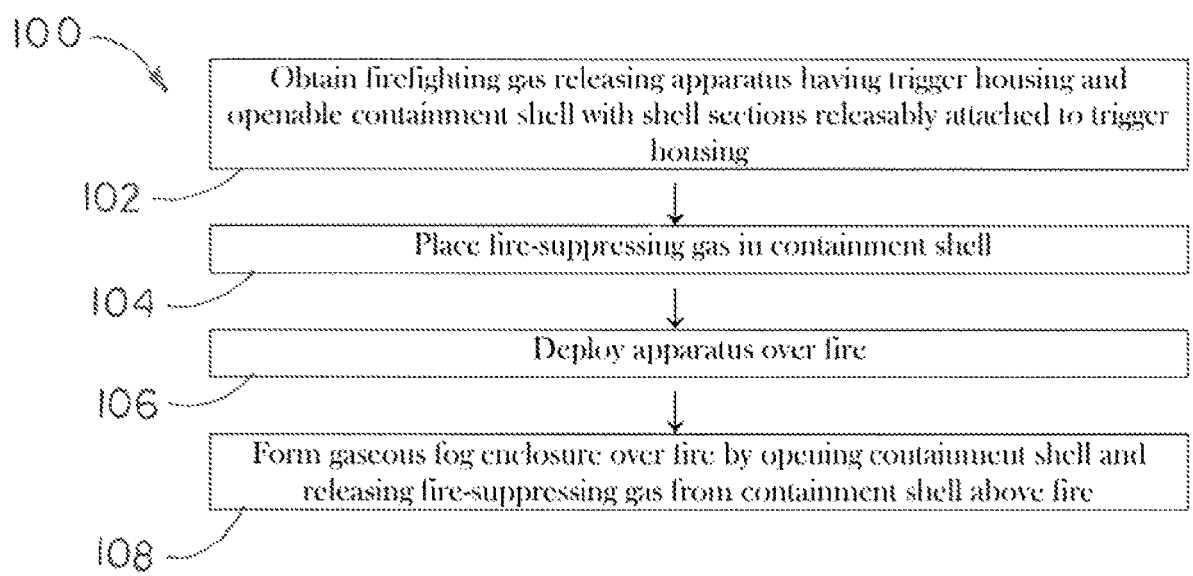
FIG. 7 is a flow diagram of an illustrative embodiment of the firefighting gas releasing methods.

Referring next to FIG. 7 of the drawings, a flow diagram of an illustrative embodiment of the firefighting gas releasing method is generally indicated by reference numeral 100. At Step 102, at least one firefighting gas releasing apparatus may be obtained. The firefighting gas releasing apparatus may include a trigger housing and an openable containment shell with shell sections releasably attached to the trigger housing.

At Step 104, at least one fire-suppressing gas may be placed in the containment shell of the firefighting gas releasing apparatus.

At Step 106, the apparatus may be deployed over at least a portion of at least one fire.

At Step 108, a gaseous fog enclosure may be formed over the fire by opening the containment shell and releasing the fire-suppressing gas from the containment shell above the fire. Accordingly, the gaseous fog or cloud enclosure encapsulates and blocks flow of oxygen to the fire as the fire continues to consume the oxygen within the dome-shaped pattern of the gaseous fog or cloud enclosure, suppressing and extinguishing the fire.

Referring next to FIGS. 8-21 of the drawings, an alternative illustrative embodiment of the firefighting gas releasing apparatuses is generally indicated by reference numeral 101. In the apparatus 101, elements which are structurally and/or functionally analogous to the respective elements of the apparatus 1 that was heretofore described with respect to FIGS. 1-6 are designated by the same respective numerals in the 101-199 series in FIGS. 8-20.

Figure 11:
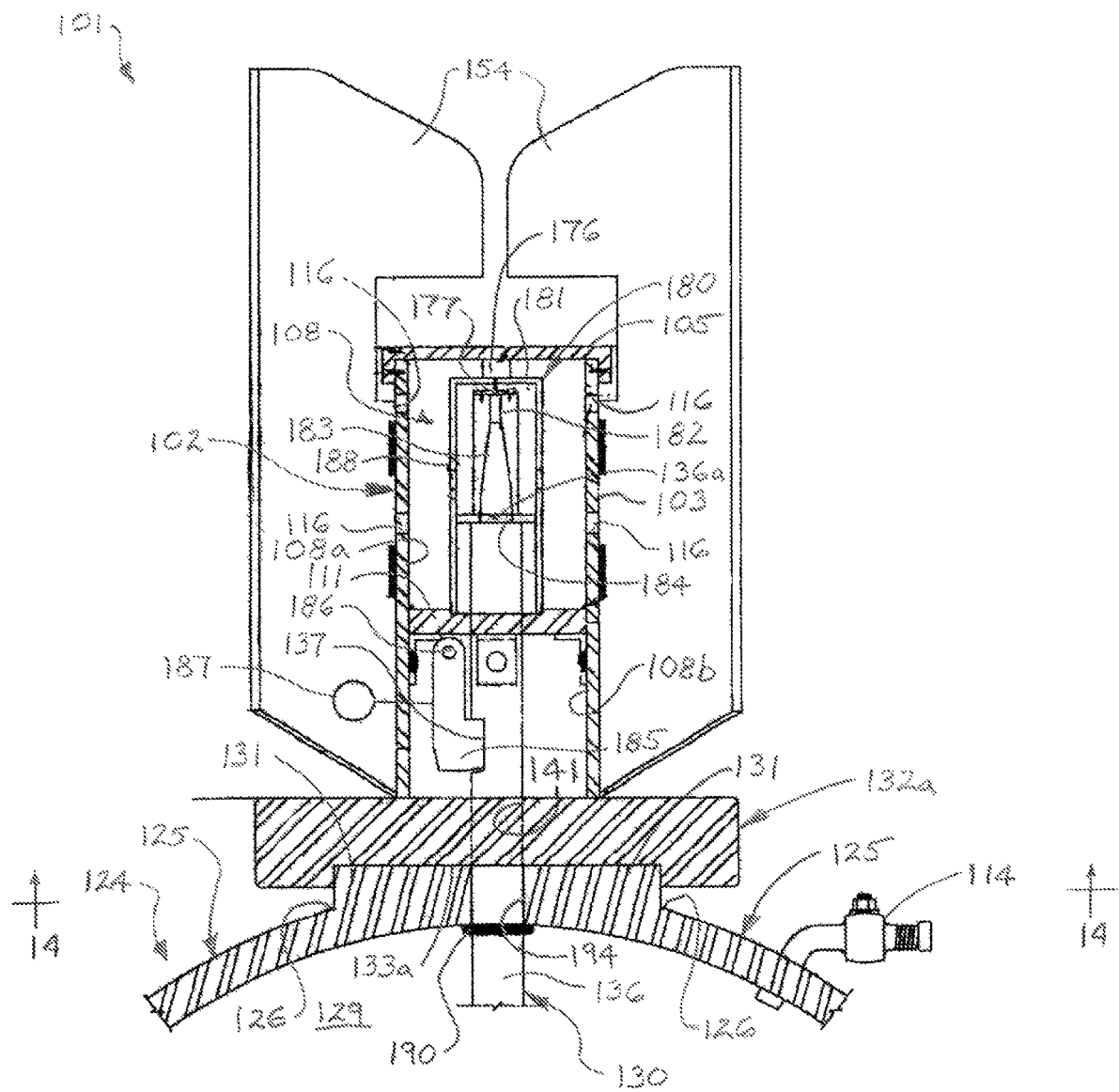
FIG. 11 is a longitudinal sectional view of the trigger housing and the upper portion of the containment shell of the illustrative firefighting gas releasing apparatus illustrated in FIG. 8, more particularly illustrating a typical firing mechanism in the trigger housing and the containment shell deployed in the closed shell configuration.
Figure 12:
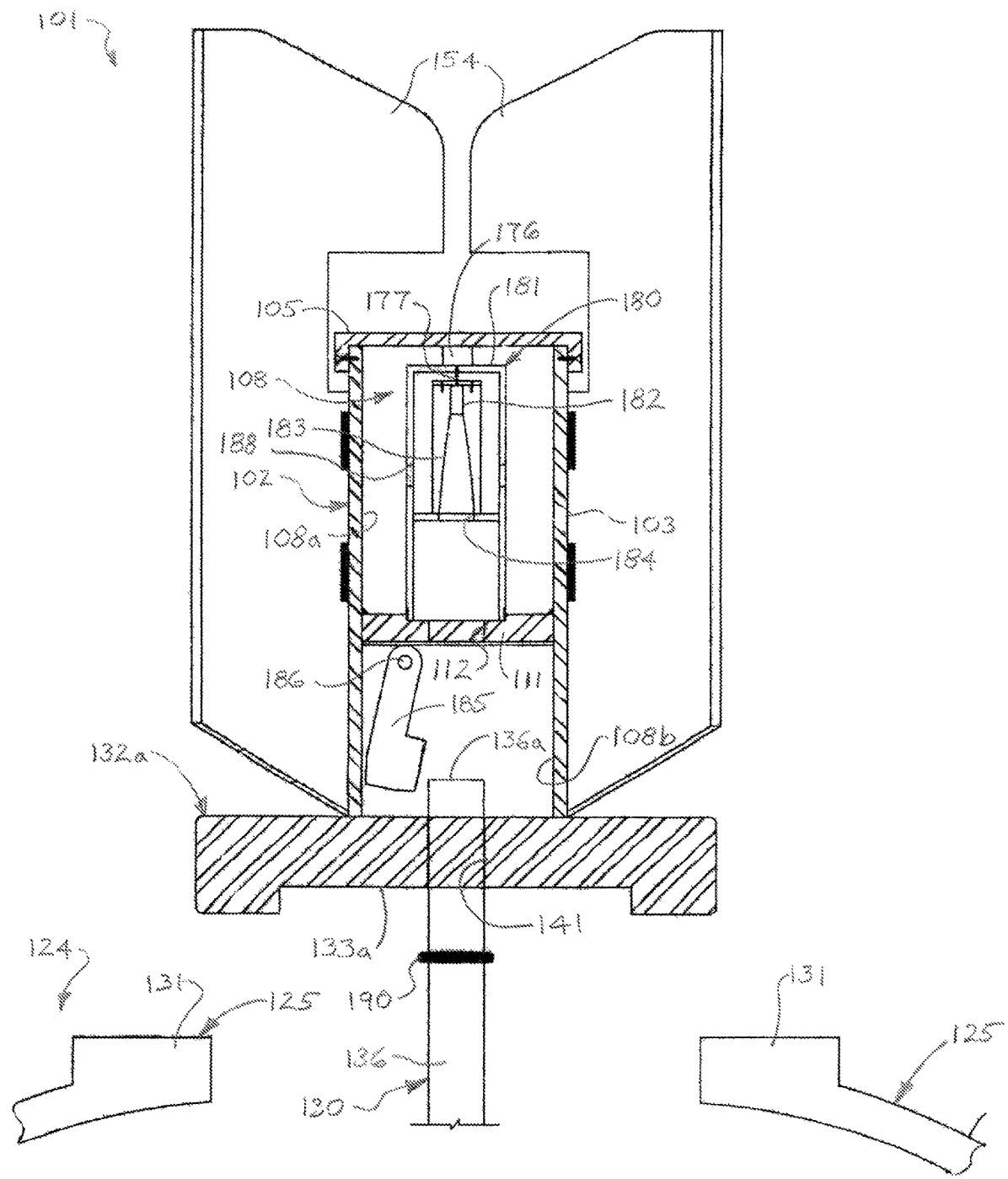
FIG. 12 is a longitudinal sectional view of the trigger housing and upper portion of the containment shell of the illustrative firefighting gas releasing apparatus illustrated in FIG. 8, with the containment shell deployed in the open shell configuration, after the shear pin has been sheared by actuation of the firing mechanism.
Figure 13:
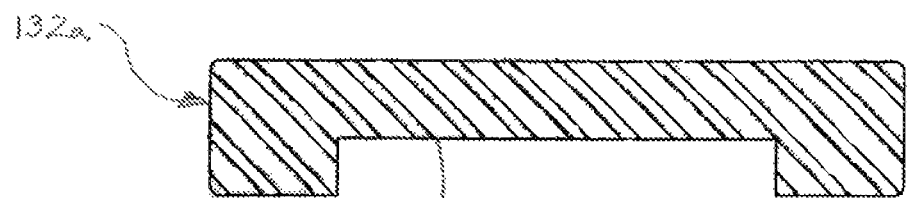
FIG. 13 is a cross-sectional view of the top typical proximal shell plate of the containment shell.
Figure 14:
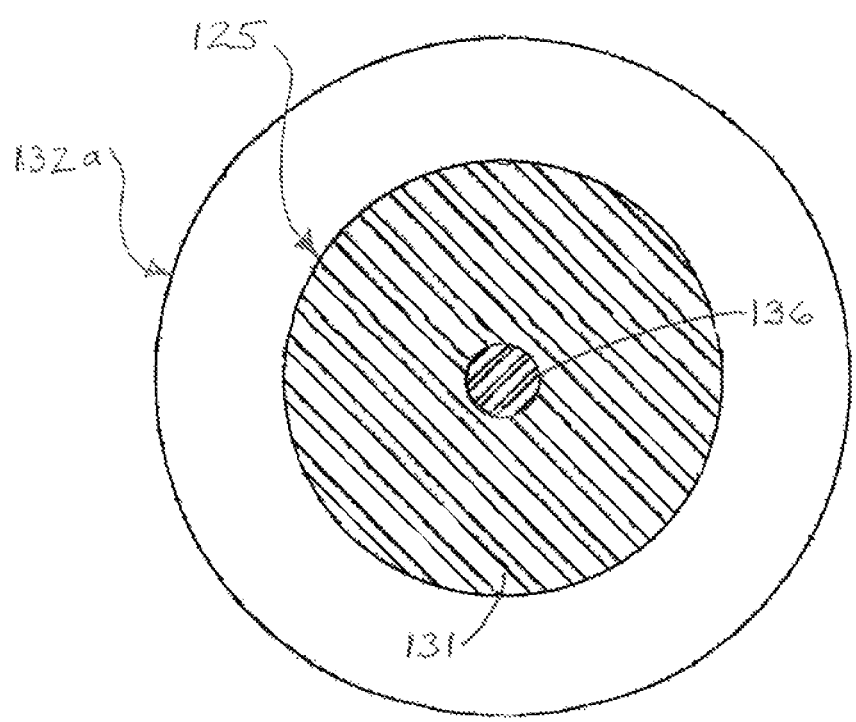
FIG. 14 is a sectional plan view, taken along section lines 14-14 in FIG. 11.
Figure 15:
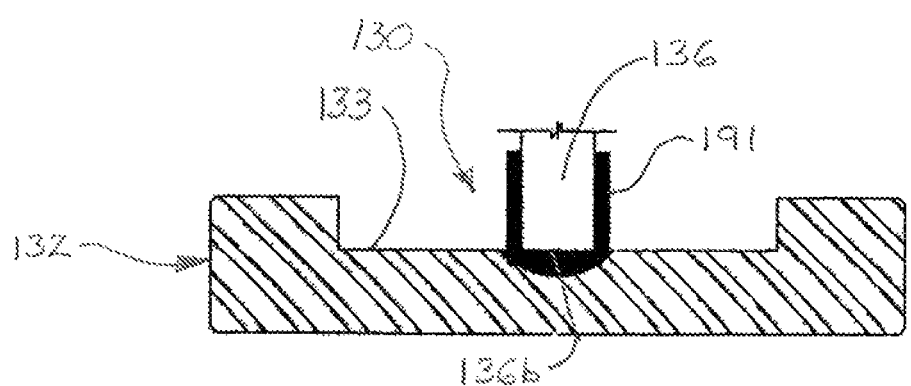
FIG. 15 is a cross-sectional view of a typical shell base plate of the containment shell, with the distal rod end of the shell release member disposed in sealing engagement with the shell base plate in the closed shell configuration of the containment shell.

As illustrated in FIGS. 11 and 12, a pin mount plate 111 may be disposed in the trigger housing interior 108 of the trigger housing 102. The pin mount plate 111 may divide the trigger housing interior 108 into an upper firing cavity 108a and a lower pin cavity 108b. As illustrated in FIG. 12, a rod opening 112 may extend through the pin mount plate 111 from the firing cavity 108a to the pin cavity 108b for purposes which will be hereinafter described.

As further illustrated in FIGS. 11 and 12, at least one firing mechanism 180 may be disposed in the firing cavity 108a of the trigger housing interior 108. The firing mechanism 180 may include a firing mechanism housing 181. The firing mechanism housing 181 may include at least one exhaust opening 188.

The firing mechanism 180 may include a remote triggering device 176 disposed in the upper portion of the trigger housing interior 108, typically above the firing mechanism housing 181. The remote triggering device 176 may be remotely-actuatable via wireless or wired actuation according to the knowledge of those skilled in the art. A bolt and firing pin 177 may be disposed in the upper portion of the firing mechanism housing 181. The remote triggering device 176 may be disposed in operable engagement with the bolt and firing pin 177 for ejection of the bolt and firing pin 177 upon actuation. An upstream pressure port 182 may be disposed in the firing mechanism housing 181 in engagement or communication with the bolt and firing pin 177.

A combustion barrel 183 may be disposed in communication with the upstream pressure port 182. The combustion barrel 183 may be elongated and funnel-shaped with a narrow barrel end at the upstream pressure port 182 and may diverge or broaden to a wide barrel end opposite the narrow barrel end. A downstream pressure port 184 may communicate with the wide barrel end of the combustion barrel 183.

The combustion barrel 183 may be configured to contain an explosive charge (not illustrated). Accordingly, responsive to typically remote actuation, the remote triggering device 176 may cause the bolt and firing pin 177 to apply mechanical pressure to the explosive charge in the combustion barrel 183 through the upstream pressure port 182. The explosive charge may combust in the combustion barrel 183 and emit a mechanical force from the downstream pressure port 184 for purposes which will be hereinafter described.

A shear pin 185 may be pivotally mounted in the pin cavity 108b of the trigger housing interior 108, typically via a shear pin pivot 186. A shear pin guide wire 187 may extend through a guide wire opening (not illustrated) in the trigger housing sidewall 103 of the trigger housing 102. The shear pin guide wire 187 may facilitate setting of the shear pin 185.

A proximal shell plate 132a may close the lower end of the pin cavity 108b. A shell cavity 133a may extend into a lower surface of the proximal shell plate 132a for purposes which will be hereinafter described. A plate opening 141 may extend through the proximal shell plate 132a. The plate opening 141 may communicate with the shell cavity 133a and the pin cavity 108b.

The shell release member 136 of the shell releasing assembly 130 may extend through the plate opening 141 in the proximal shell plate 132a. As illustrated in FIG. 11, in the closed shell position of the containment shell 124, the shell release member 136 may be deployed in the shell-retaining configuration, in which the shell release member 136 extends through the rod opening 112 (FIG. 12) in the pin mount plate 111. The upper or proximal rod end 136a of the shell release member 136 may terminate in the firing mechanism housing 181 of the firing mechanism 180, at the downstream pressure port 184. A pin notch 137 may extend into the shell release member 136. Accordingly, as further illustrated in FIG. 11, in the shell retaining configuration of the shell release member 136, the shear pin 185 may insert into the pin notch 137 to maintain the shell 1s release member 136 in the shell-retaining configuration. Responsive to actuation of the firing mechanism 180, typically as was heretofore described, the explosive charge in the combustion barrel 183 may drive the shell release member 136 from the shell retaining configuration to the shell releasing configuration as the shell release member 136 forcedly pivots the shear pin 185 from the pin notch 137 for release of the containment shell 124, as illustrated in FIG. 12 and will be hereinafter described. As further illustrated in FIG. 12, in the open shell configuration of the containment shell 124 and the shell releasing configuration of the shell release member 136, the proximal rod end 136a may be withdrawn from the rod opening 112 and disposed in the pin cavity 108b of the trigger housing interior 108.

As illustrated in FIGS. 8-10 and 15, the shell base plate 132 of the shell releasing assembly 130 may terminate the distal rod end 136b of the shell release member 136. The shell base plate 132 may have a shell cavity 133. A lower seal ring 191 may be provided on the distal rod end 136b of the shell release member 136. Accordingly, the lower seal ring 191 may impart a fluid-tight seal between the shell cavity 133 of the shell base plate 132 and the distal rod end 136b of the shell release member 136.

Figure 18:
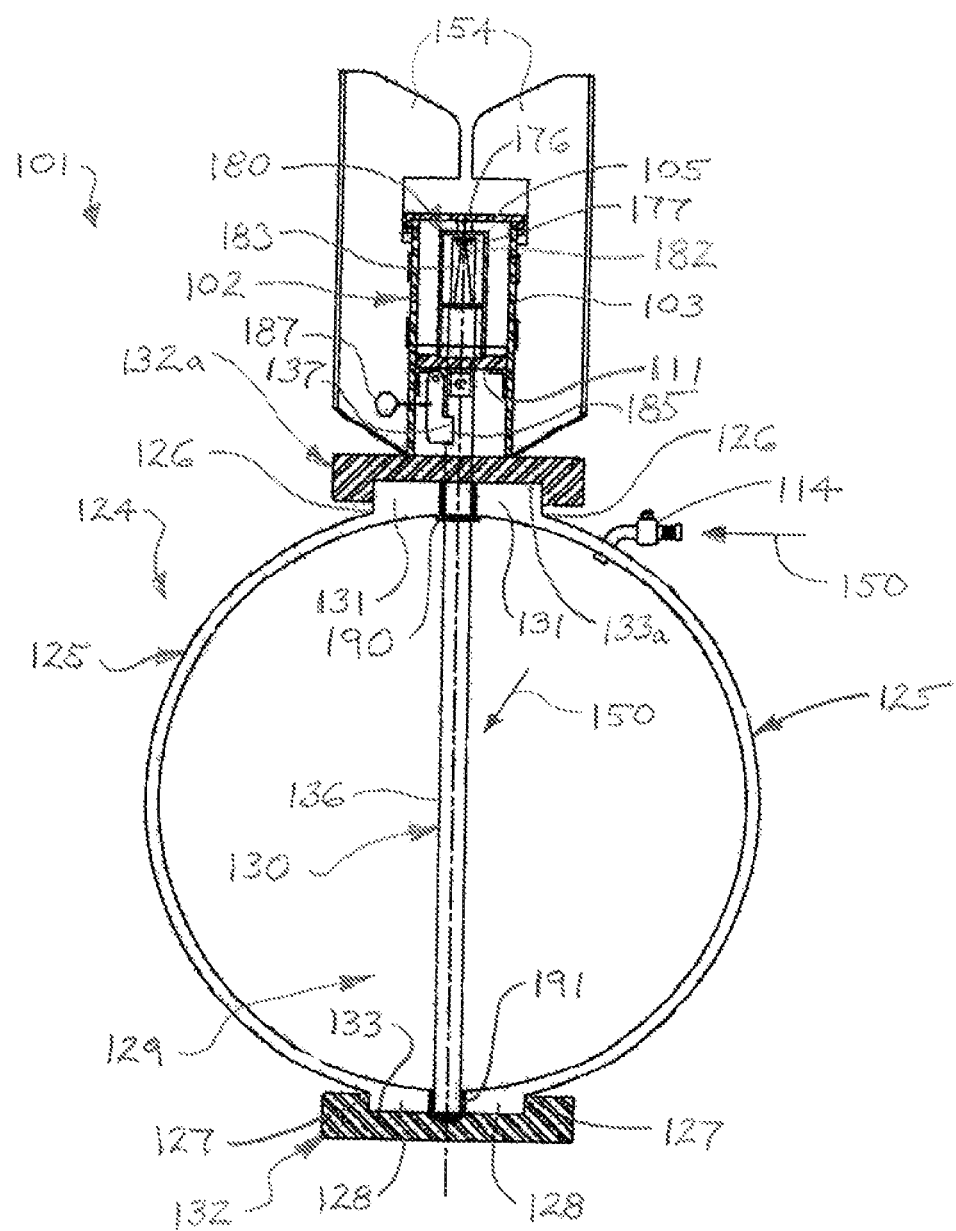
FIG. 18 is a longitudinal sectional view of the alternative illustrative firefighting gas releasing apparatus in a typical assembly stage III of the apparatus.
Figures 19, 20:
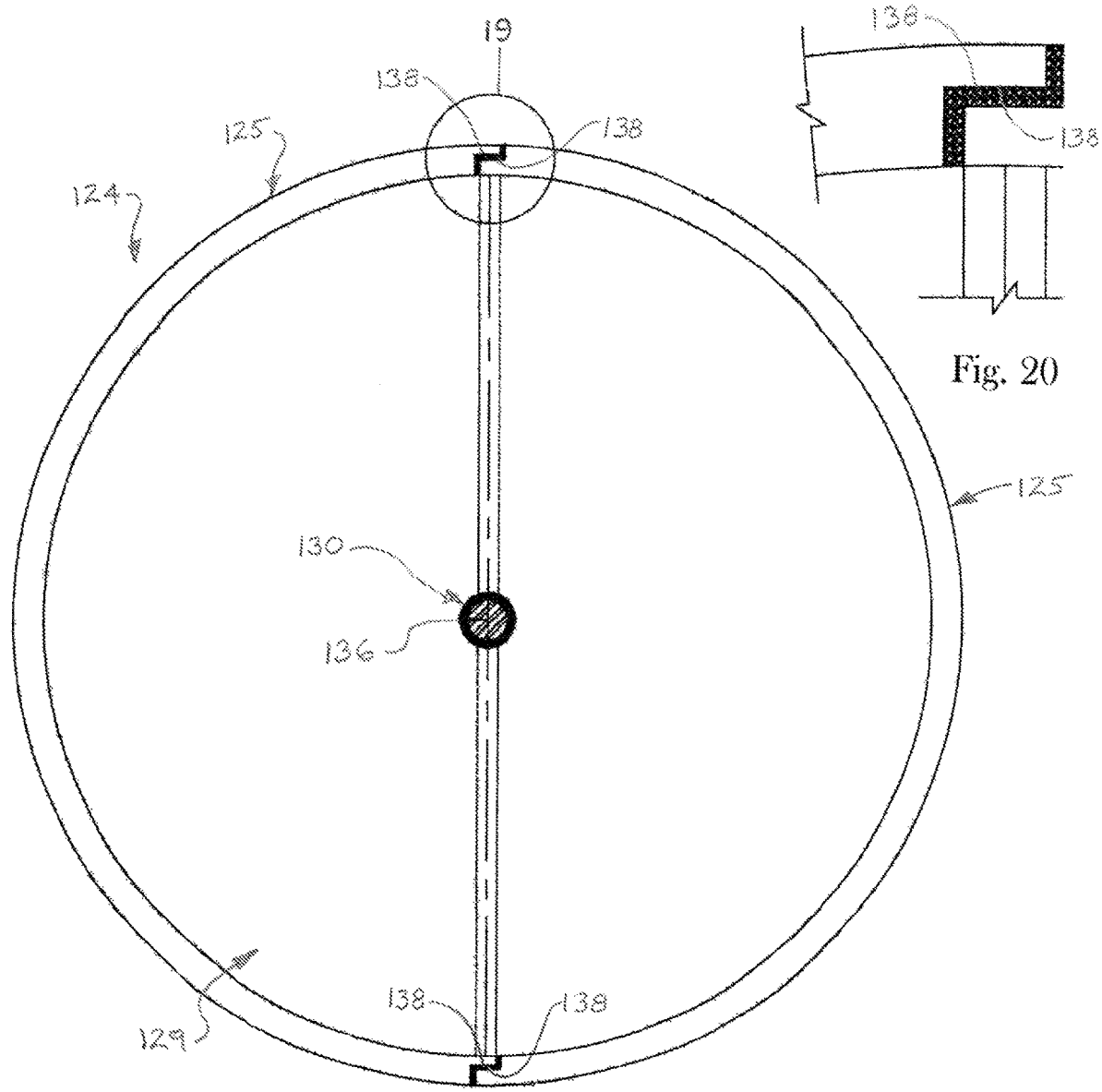
FIG. 19 is a sectional view of the containment shell of the firefighting gas releasing apparatus in the closed shell configuration, more particularly illustrating typical interlocking side shell edges on the shell sections of the containment shell.
FIG. 20 is an enlarged sectional view, taken along section line 20 in FIG. 19.

The containment shell 124 of the apparatus 101 may include at least two releasable shell sections 125. The shell sections 125 may be fitted between the shell base plate 132 and the proximal shell plate 132a of the shell releasing assembly 130. As illustrated in FIG. 19, in some embodiments, the containment shell 124 may have a pair of mating shell sections 125. The shell sections 125 may be semicircular in cross-section and may sealingly engage, interface or interlock with each other at a pair of side shell edges 138. The shell sections 125 may be deployable from the closed shell configuration illustrated in FIG. 8 and released to the open shell configuration illustrated in FIG. 9 typically as will be hereinafter described. In the closed shell configuration, the shell interior 129 of the containment shell 124 is configured to contain a supply of the fire-suppressing gas 150, as illustrated in FIG. 18. In the open shell configuration, the shell interior 129 is configured to release the fire-suppressing gas 150, as illustrated in FIG. 10.

Figure 8:
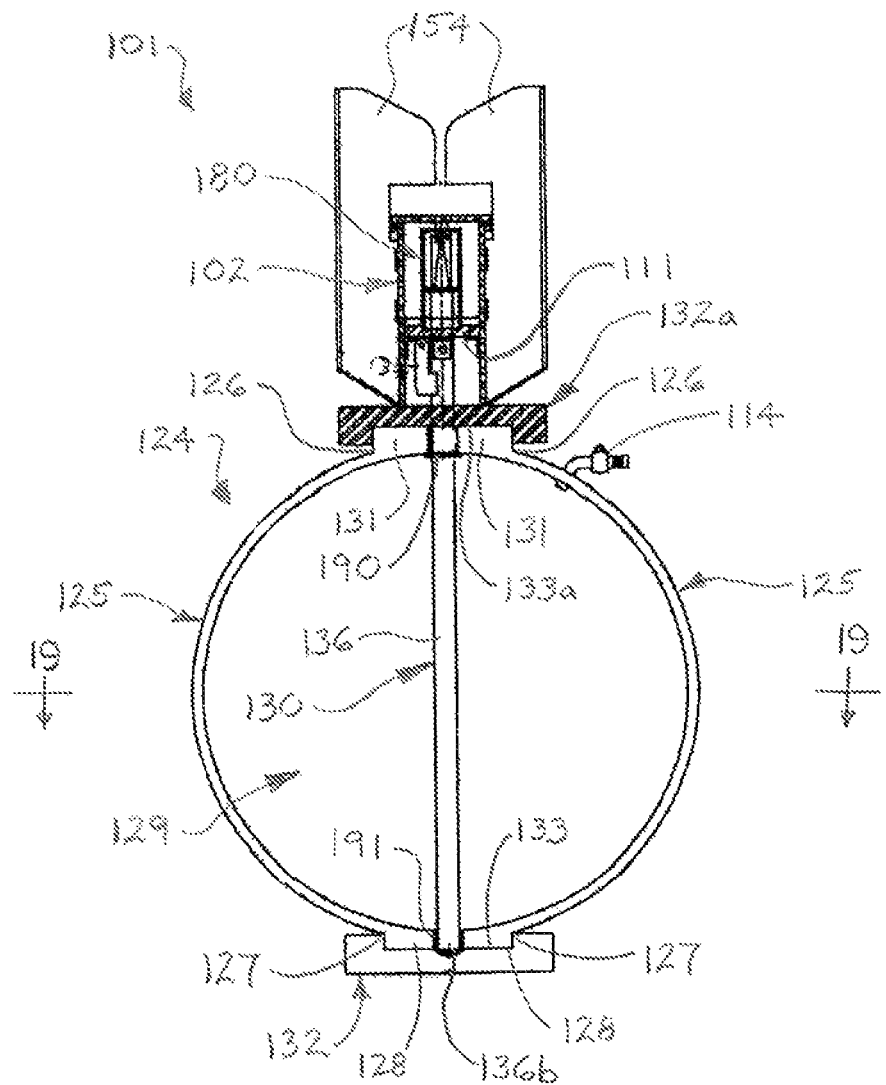
FIG. 8 is a longitudinal sectional view of an alternative illustrative embodiment of the firefighting gas releasing apparatuses, with the containment shell of the apparatus deployed in a pre-released, closed shell configuration.
Figure 9:
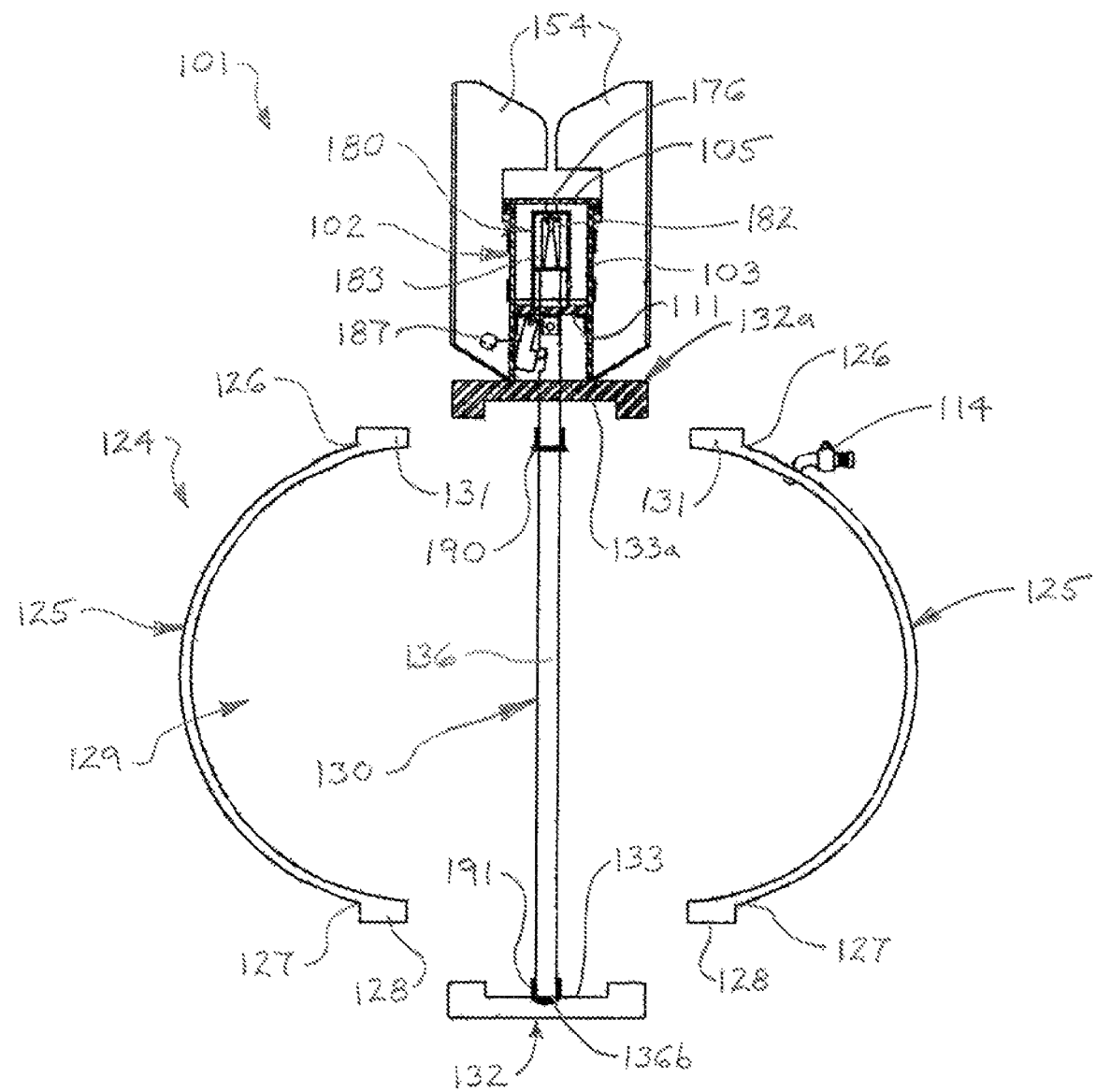
FIG. 9 is an exploded longitudinal sectional view of the illustrative firefighting gas releasing apparatus illustrated in FIG. 8, with the containment shell deployed in the released, open shell configuration.
Figure 10:
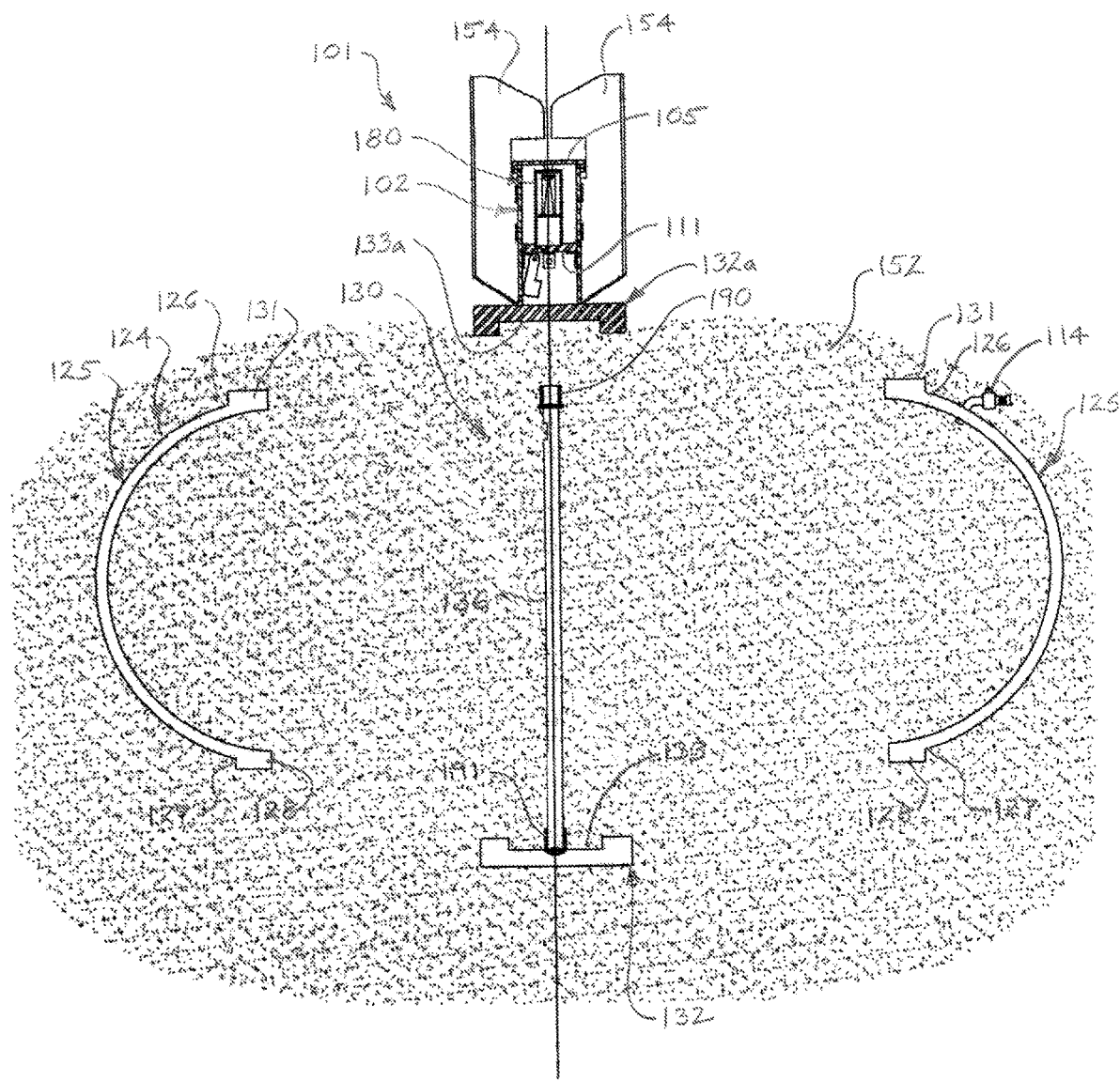
FIG. 10 is an exploded longitudinal sectional view of the illustrative firefighting gas releasing apparatus illustrated in FIG. 8, with the containment shell deployed in the open shell configuration and a gaseous fog or cloud enclosure formed by gas released from the containment shell in typical application of the apparatus.

As particularly illustrated in FIG. 9, each shell section 125 of the containment shell 124 may have a proximal shell edge 126 and a distal shell edge 127 opposite the proximal shell edge 126. The side shell edges 138 (FIG. 19) may extend from the proximal shell edge 126 to the distal shell edge 127. A distal shell retention flange 128 may extend along the distal shell edge 127 of each shell section 125. A proximal shell retention flange 131 may extend along the proximal shell edge 126 of each shell section 125. Accordingly, in the closed shell configuration of the containment shell 124 (and the shell retaining configuration of the shell releasing assembly 130), as illustrated in FIG. 8, the distal shell retention flange 128 of each shell section 125 may insert into the shell cavity 133 of the shell base plate 132. In like manner, the proximal shell retention flange 131 of each shell section 125 may insert into the shell cavity 133a of the proximal shell plate 132a. The shell sections 125 may thus be retained in the closed shell configuration between the shell base plate 132 and the proximal shell plate 132a as the shear pin 185 inserts in the pin notch 137 of the shell release member 136. As illustrated in FIG. 11, the shell release member 136 of the shell releasing assembly 130 may extend through a flange cavity 194 formed between the proximal shell retention flanges 131 of the adjacent shell sections 125. In some embodiments, an upper seal ring 190 may be disposed in the flange cavity 194, and the shell release member 136 may extend through the upper seal ring 190 to impart a fluid-tight seal between the shell interior 129 of the containment shell 124 and the exterior of the containment shell 124.

In some embodiments, at least one filling port 114 may extend through at least one of the shell sections 125 of the containment shell 124 in fluid communication with the shell interior 129. The filling port 114 may include a one-way valve (not illustrated) to facilitate unidirectional flow of the fire-suppressing gas 150 into the shell interior 129 of the containment shell 124.

Figure 16:
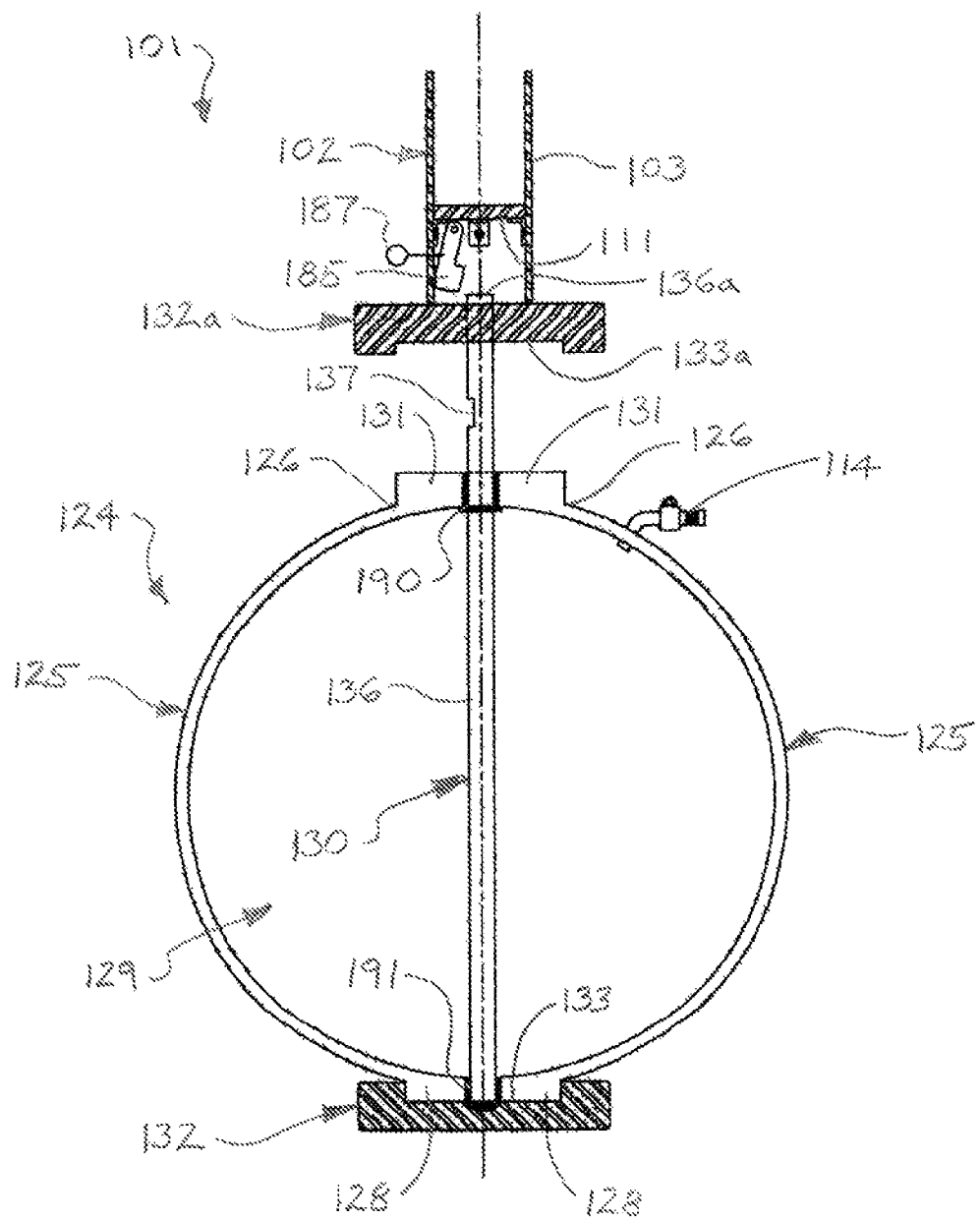
FIG. 16 is an exploded longitudinal sectional view of the alternative illustrative firefighting gas releasing apparatus in a typical assembly stage I of the apparatus.

Referring next to FIGS. 10 and 16-18 of the drawings, application of the apparatus 101 may be as was heretofore described with respect to application of the apparatus 1 in FIG. 6. The components of the firing mechanism 180 may initially be installed and set. As illustrated in FIG. 16, in a typical assembly stage I of the apparatus 101, after all the components are assembled, the shell base plate 132 with the shell release member 136 may be placed on a flat assembly surface (not illustrated) with the shell sections 125 of the containment shell 124 in place. The proximal shell plate 132a may be dropped into place and the seals engaged as the distal shell retainer flanges 128 insert in the shell cavity 133 of the shell base plate 132 and the proximal shell retention flanges 131 insert in the shell cavity 133a of the proximal shell plate 132a. The shear pin 185 may be pivoted to insert in the pin notch 137 in the shell release member 136 to retain the shell release member 136 in the shell retaining configuration such that the shell release member 136 maintains the shell base plate 132 in sufficient proximity to the proximal shell plate 132a to engage and maintain the shell sections 125 of the containment shell 124 in the assembled, closed shell configuration.

Figure 17:
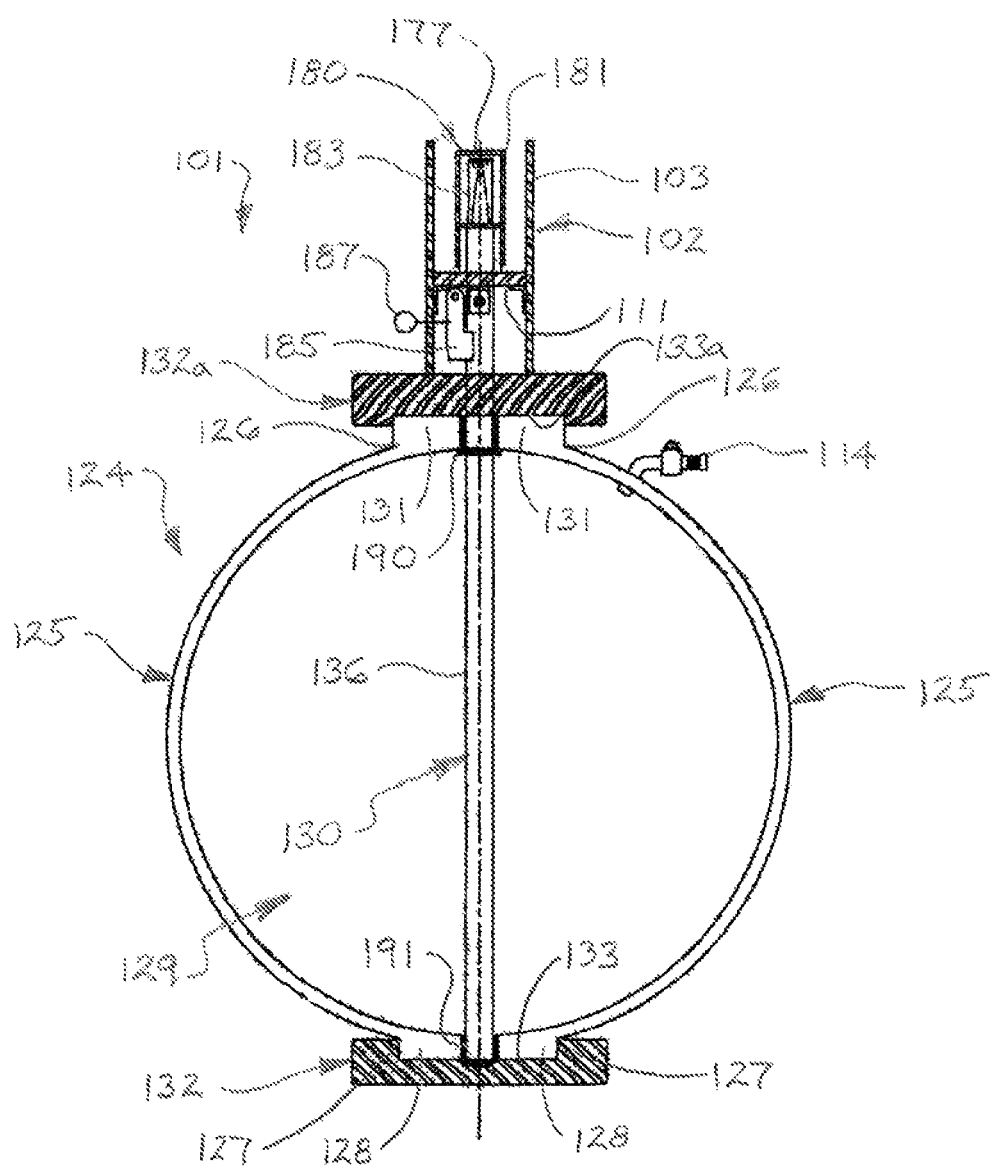
FIG. 17 is a longitudinal sectional view of the alternative illustrative firefighting gas releasing apparatus in a typical assembly stage II of the apparatus.

As illustrated in FIG. 17, in a typical assembly stage I of the apparatus 101, the firing mechanism 180 with the bolt and firing pin 177 (FIG. 11) may be screwed in place into the base receptacle of the combustion barrel 183.

As illustrated in FIG. 18, in a typical assembly stage lit of the apparatus 101, the remote triggering device 176 may be installed into contact with the bolt and firing pin 177. The combustion chamber cap (not illustrated) may then be installed, and the tail fins 154 may be deployed in place on the trigger housing 102. A supply of the fire-suppressing gas 150 may be charged into the shell interior 129 of the containment shell 124, typically through the filling port 114.

In some applications, at least one apparatus 101 may be deployed from an aircraft 66 (FIG. 6) over at least one fire 58 to be extinguished. Upon actuation of the remote triggering device 176, the firing mechanism 180 may apply downward pressure on the shell release member 136 of the shell releasing assembly 130 to initially dislodge the shear pin 185 from the pin notch 137 in the shell release member 136 and then drive the shell release member 136 from the shell retaining configuration, downwardly through the rod opening 112 (FIG. 12) in the pin mount plate 111 and the plate opening 141 in the proximal shell plate 132a to the shell releasing configuration. Accordingly, as illustrated in FIG. 16, the distal rod end 136b of the shell release member 136 may move the attached shell base plate 132 downwardly or away from the stationary proximal shell plate 132a of the shell releasing assembly 130. This action may cause the distal shell retention flanges 128 to disengage from the shell base plate 132 and the proximal shell retention flanges 131 to disengage from the proximal shell plate 132a such that the fire-suppressing gas 150 (FIG. 21) in the containment shell 124 pushes outwardly and spreads the released shell sections 125, forming the gaseous fog or cloud enclosure 152, as illustrated in FIG. 10. The fog or cloud enclosure 152 may cool and block flow of oxygen to the fire 58, which may consume the oxygen within the dome-shaped pattern of the gaseous fog or cloud enclosure 152 such that the fire 58 is suppressed and extinguished.

While certain illustrative embodiments of the disclosure have been described above, it will be recognized and understood that various modifications can be made to the embodiments and the appended claims are intended to cover all such modifications which may fall within the spirit and scope of the disclosure.

What is claimed is:

1. A firefighting gas releasing apparatus, comprising:
   a trigger housing;
   a containment shell having a plurality of shell sections carried by the trigger housing, the plurality of shell sections positional in a closed shell configuration and an open shell configuration;
   a shell interior formed by the containment shell in the closed shell configuration, the shell interior configured to contain a supply of at least one fire-suppressing gas; and
   a selectively-actuatable shell releasing assembly carried by the trigger housing, the shell releasing assembly deployable in a shell retaining configuration configured to engage the plurality of shell sections and maintain the containment shell in the closed shell configuration and in a shell releasing configuration configured to disengage the plurality of shell sections for deployment of the containment shell to the open shell configuration.

2. The firefighting gas releasing apparatus of claim 1 wherein the shell releasing assembly comprises a proximal shell plate carried by the trigger housing, a shell release member slidably disposed with respect to the proximal shell plate and a shell base plate carried by the shell release member in spaced-apart relationship to the proximal shell plate, and wherein the plurality of shell sections of the containment shell are engaged between the proximal shell plate and the shell base plate in the shell retaining configuration of the shell releasing assembly.

3. The firefighting gas releasing apparatus of claim 2 wherein each of the plurality of shell sections comprises a proximal shell edge, a proximal shell retention flange on the proximal shell edge, a distal shell edge and a distal shell retention flange on the distal shell edge, and the proximal shell retention flange engages the proximal shell plate and the distal shell retention flange engages the shell base plate in the shell retaining configuration of the shell releasing assembly.

4. The firefighting gas releasing apparatus of claim 3 wherein the proximal shell plate comprises a shell cavity and the shell base plate comprises a base cavity, and the proximal shell retention flange inserts in the shell cavity and the distal shell retention flange inserts in the base cavity in the shell retaining configuration of the shell releasing assembly.

5. The firefighting gas releasing apparatus of claim 3 further comprising a pair of side shell edges extending from the proximal shell edge to the distal shell edge of each of the plurality of shell sections, the pair of side shell edges of each of the plurality of shell sections sealingly interlocking with the pair of side shell edges of each adjacent one of the plurality of shell sections.

6. The firefighting gas releasing apparatus of claim 2 further comprising at least one firing mechanism in the trigger housing, and wherein the at least one firing mechanism is configured to drive the shell release member of the shell releasing assembly from the shell retaining configuration to the shell releasing configuration responsive to actuation of the firing mechanism.

7. The firefighting gas releasing apparatus of claim 1 further comprising a plurality of tail fins extending from the trigger housing.

8. The firefighting gas releasing apparatus of claim 1 further comprising at least one filling port disposed in fluid communication with the shell interior of the containment shell.

9. A firefighting gas releasing apparatus, comprising:
   a trigger housing;
   at least one firing mechanism disposed in the trigger housing, the at least one firing mechanism including:
      a remote triggering device; and
      a combustion barrel communicating with the remote triggering device, the combustion barrel configured to contain an explosive charge;
   a containment shell having a plurality of shell sections carried by the trigger housing, the plurality of shell sections positional in a closed shell configuration and an open shell configuration;
   a shell interior formed by the containment shell in the closed shell configuration, the shell interior configured to contain a supply of at least one fire-suppressing gas;
   a selectively-actuatable shell releasing assembly carried by the trigger housing, the shell releasing assembly deployable in a shell retaining configuration configured to engage the plurality of shell sections and maintain the containment shell in the closed shell configuration and in a shell releasing configuration configured to disengage the plurality of shell sections for deployment of the containment shell to the open shell configuration; and wherein the shell releasing assembly is configured to deploy from the shell retaining configuration to the shell releasing configuration responsive to actuation of the remote triggering device of the at least one firing mechanism.

10. The firefighting gas releasing apparatus of claim 9 wherein the shell releasing assembly comprises a proximal shell plate carried by the trigger housing, a shell release member slidably disposed with respect to the proximal shell plate and a shell base plate carried by the shell release member in spaced-apart relationship to the proximal shell plate, and wherein the plurality of shell sections of the containment shell are engaged between the proximal shell plate and the shell base plate in the shell retaining configuration of the shell releasing assembly.

11. The firefighting gas releasing apparatus of claim 10 wherein each of the plurality of shell sections comprises a proximal shell edge, a proximal shell retention flange on the proximal shell edge, a distal shell edge and a distal shell retention flange on the distal shell edge, and the proximal shell retention flange engages the proximal shell plate and the distal shell retention flange engages the shell base plate in the shell retaining configuration of the shell releasing assembly.

12. The firefighting gas releasing apparatus of claim 11 wherein the proximal shell plate comprises a shell cavity and the shell base plate comprises a base cavity, and the proximal shell retention flange inserts in the shell cavity and the distal shell retention flange inserts in the base cavity in the shell retaining configuration of the shell releasing assembly.

13. The firefighting gas releasing apparatus of claim 11 further comprising a pair of side shell edges extending from the proximal shell edge to the distal shell edge of each of the plurality of shell sections, the pair of side shell edges of each of the plurality of shell sections sealingly interlocking with the pair of side shell edges of each adjacent one of the plurality of shell sections.

14. The firefighting gas releasing apparatus of claim 10 further comprising at least one shear pin carried by the trigger housing, the at least one shear pin configured to detachably engage the shell release member of the of the shell releasing assembly to retain the shell release member in the shell retaining configuration.

15. The firefighting gas releasing apparatus of claim 9 further comprising a plurality of tail fins extending from the trigger housing.

16. The firefighting gas releasing apparatus of claim 9 further comprising at least one filling port extending through at least one of the plurality of shell sections of the containment shell.

17. A firefighting gas releasing method, comprising:
obtaining at least one firefighting gas releasing apparatus having a trigger housing, an openable containment shell with a plurality of shell sections carried by the trigger housing with the plurality of shell sections positional in a closed shell configuration and an open shell configuration, a shell interior formed by the containment shell in the closed shell configuration and a selectively-actuatable shell releasing assembly carried by the trigger housing and deployable in a shell retaining configuration configured to engage the plurality of shell sections and maintain the containment shell in the closed shell configuration and in a shell releasing configuration configured to disengage the plurality of shell sections for deployment of the containment shell to the open shell configuration;

placing at least one fire-suppressing gas in the shell interior of the containment shell;

deploying the firefighting gas releasing apparatus over at least a portion of at least one fire; and forming at least one gaseous fog enclosure over the at least a portion of the at least one tire by actuating the shell releasing assembly, whereby the shell releasing assembly disengages the plurality of shell sections, opening the containment shell and releasing the at least one fire-suppressing gas from the containment shell over the at least a portion of the at least one fire.

18. The firefighting gas releasing method of claim 17 wherein obtaining the at least one firefighting gas releasing apparatus comprises obtaining the at least one firefighting gas releasing apparatus having the plurality of shell sections releasably carried by the trigger housing.

19. The firefighting gas releasing method of claim 17 wherein obtaining the at least one firefighting gas releasing apparatus comprises obtaining the at least one firefighting gas releasing apparatus having at least one firing mechanism in the trigger housing, and wherein releasing the at least one fire-suppressing gas from the containment shell comprises remotely actuating the at least one firing mechanism.

20. The firefighting gas releasing method of claim 17 wherein deploying the firefighting gas releasing apparatus over at least a portion of at least one fire comprises deploying the firefighting gas releasing apparatus over at least a portion of at least one fire from an aircraft.

\* \* \* \* \*